United States Patent
Araujo Da Silva et al.

(10) Patent No.: US 9,481,754 B2
(45) Date of Patent: Nov. 1, 2016

(54) GRAFT POLYMER TO WHICH COMBINED NITROGEN MOLECULES ARE GRAFTED

(75) Inventors: José Araujo Da Silva, Clermont-Ferrand (FR); Jean-Michel Favrot, Clermont-Ferrand (FR); Anne Frédérique Salit, Clermont-Ferrand (FR); Nicolas Seeboth, Clermont-Ferrand (FR)

(73) Assignees: COMPAGNIE GENERALE DES ESTRABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 520 days.

(21) Appl. No.: 13/809,859

(22) PCT Filed: Jul. 12, 2011

(86) PCT No.: PCT/EP2011/061804
§ 371 (c)(1),
(2), (4) Date: Feb. 8, 2013

(87) PCT Pub. No.: WO2012/007443
PCT Pub. Date: Jan. 19, 2012

(65) Prior Publication Data
US 2014/0316057 A1  Oct. 23, 2014

(30) Foreign Application Priority Data

Jul. 13, 2010 (FR) .................................... 10 02937

(51) Int. Cl.
| C08C 19/22 | (2006.01) |
| C08F 236/08 | (2006.01) |
| B60C 1/00 | (2006.01) |
| C08C 19/28 | (2006.01) |
| C08K 3/00 | (2006.01) |

(52) U.S. Cl.
CPC .............. *C08F 236/08* (2013.01); *B60C 1/00* (2013.01); *C08C 19/22* (2013.01); *C08C 19/28* (2013.01); *C08K 3/0033* (2013.01)

(58) Field of Classification Search
CPC .............................. C08C 19/22; C08F 236/08
See application file for complete search history.

(56) References Cited

U.S. PATENT DOCUMENTS

| 2004/0106744 A1 | 6/2004 | Chino et al. |
| 2005/0239639 A1 | 10/2005 | Monteil et al. |
| 2006/0084730 A1 | 4/2006 | Fukushima et al. |
| 2006/0199917 A1 | 9/2006 | Chino |
| 2009/0186961 A1* | 7/2009 | Araujo Da Silva et al. . 523/150 |
| 2011/0183098 A1 | 7/2011 | Hidalgo et al. |

FOREIGN PATENT DOCUMENTS

| EP | 0 341 496 A | 11/1989 |
| JP | 2008-208163 A | 9/2008 |
| WO | 2004035639 A1 | 4/2004 |
| WO | WO 2010/031956 A1 | 3/2010 |

OTHER PUBLICATIONS

International Search Report (PCT/ISA/210) issued on Oct. 6, 2011, by the European Patent Office as the International Searching Authority for International Application No. PCT/EP2011/061804.
M. Galimberti et al., "Elastomeric Compounds with Silica. Lower Hysteresis in the Presence of Functionalised Isoprene Oligomers", Macromolecular Symposia, Mar. 13, 2006, vol. 234 (abstract only).

* cited by examiner

*Primary Examiner* — Peter D Mulcahy
(74) *Attorney, Agent, or Firm* — Dickinson Wright PLLC

(57) ABSTRACT

The present invention relates to a modified polymer obtained by grafting a compound comprising at least one group Q, and at least one group A bonded together by at least, and preferably, one "spacer" group Sp in which:
Q comprises an azo-carbonyl group capable of being grafted onto the polymer chain by an "ene reaction",
A comprises an associative group comprising at least one nitrogen atom,
Sp is an atom or a group of atoms forming a bond between Q and A.

16 Claims, No Drawings

GRAFT POLYMER TO WHICH COMBINED NITROGEN MOLECULES ARE GRAFTED

The present invention relates to a polymer modified by grafting nitrogen-containing associative molecules along the chain.

Modified polymers containing associative groups along the polymer chain are polymers comprising at least one unit making them capable of combining with each other or with a filler via non-covalent bonds. One advantage of these polymers is that these physical bonds are reversible under the influence of external factors such as the temperature or the period of use for example. Thus, the mechanical properties of these modified polymers can be modulated according to the parameters of the environment for use.

Such polymers are for example described in the document published under the number WO2010/031956.

This document describes elastomers comprising flexible polymer chains combined with each other, on the one hand, via bridges for permanent crosslinking based on covalent bonds and, on the other hand, via bridges for crosslinking based on non-covalent bonds. The molecules grafted onto the elastomers contain associative groups based on a nitrogen-containing heterocycle allowing the establishment of the physical bonds. Imidazolidinyl, triazolyl, triazinyle, bis-ureyl and ureido-pyrimidyl groups are mentioned among the associated groups envisaged in this document.

To modify the elastomers, they may be reacted with a molecule containing on the one hand the associative group and on the other hand a reactive group forming a covalent bond with a reactive functional group carried by the elastomer. This therefore involves prior functionalization of the elastomer.

That is the reason why research studies are being carried out on other processes for modifying polymers in order to introduce associative groups along the chain.

The aim of the present invention is therefore to provide an alternative for modifying polymers applicable to polymers not containing reactive functional groups, and consequently not requiring pre-functionalization of the elastomer.

This aim is achieved in that the inventors have just discovered that novel molecules comprising at the same time at least one associative group and at least one reactive group make it possible to modify a polymer, comprising at least one double bond, without the need for the polymer in question to contain reactive functional groups.

The subject of the invention is therefore a polymer modified by grafting a compound comprising at least one group Q, and at least one group A bonded together by at least, and preferably, one "spacer" group Sp in which:

Q comprises a reactive group of an azo-dicarbonyl unit,
A comprises an associative group comprising at least one nitrogen atom,
Sp is an atom or a group of atoms forming a bond between Q and A.

The subject of the invention is also a process which makes it possible to prepare the modified polymer defined above by grafting compounds comprising nitrogen-containing associative groups, the polymer not being necessarily functionalized.

Another subject of the invention is a rubber composition comprising an elastomer, preferably a diene elastomer, modified by grafting with the compound comprising at least one group Q, and at least one group A bonded together by at least, and preferably, one "spacer" group Sp as described above. Indeed, the modification of the elastomer makes it possible to ensure good polymer-filler interaction which is beneficial for the final properties of the composition.

Because of this good polymer-filler interaction within the rubber composition, the latter is particularly suitable for the manufacture of tyres. A tyre comprising such a composition also forms part of the invention.

Accordingly, the subject of the invention is a polymer modified by grafting a compound comprising at least one group Q, at least one group A bonded together by at least, and preferably, one "spacer" group Sp as described above.

The expression "polymer" is understood to mean according to the invention any polymer containing at least one unsaturation or double bond capable of reacting with the compound described above.

Preferably, the polymers of the present invention are diene elastomers.

These diene elastomers may be classified in a known manner into two categories, those termed essentially unsaturated and those termed essentially saturated. These two categories of diene elastomers may be envisaged in the context of the invention.

An essentially saturated diene elastomer has a low or very low amount of motifs or units of diene origin (conjugated dienes) which is always below 15% (mol %). Accordingly, for example, some butyl rubbers or diene and alpha-olefin copolymers of the EPDM type enter into the definition of essentially saturated diene elastomers.

By contrast, the expression "essentially unsaturated diene elastomer" is understood to mean a diene elastomer that is at least partially derived from conjugated diene monomers, having an amount of motifs or units of diene origin (conjugated dienes) which is greater than 15% (mol %). In the category of "essentially unsaturated" diene elastomers, the expression "highly unsaturated" diene elastomer is understood to mean in particular a diene elastomer having an amount of motifs of diene origin (conjugated dienes) which is greater than 50%.

The expression "diene elastomer capable of being used in the invention" is understood to mean more particularly:
  (a)—any homopolymer obtained by polymerization of a conjugated diene monomer having from 4 to 12 carbon atoms;
  (b)—any copolymer obtained by copolymerization of one or more conjugated dienes with each other or with one or more aromatic vinyl compounds having from 8 to 20 carbon atoms;
  (c)—a ternary copolymer obtained by copolymerization of ethylene, of an α-olefin having 3 to 6 carbon atoms with a non-conjugated diene monomer having from 6 to 12 carbon atoms, such as for example the elastomers obtained from ethylene, propylene with a non-conjugated diene monomer of the abovementioned type such as in particular hexadiene-1,4, ethylidene norbornene, dicyclopentadiene; such polymers are described in particular in the documents WO 2004/035639A1 and US 2005/0239639A1;
  (d)—an isobutene and isoprene copolymer (butyl rubber), and the halogenated, in particular chlorinated or brominated, versions of this type of copolymer.

Although applicable to any type of diene elastomer, the use of at least one diene elastomer of the highly unsaturated type, in particular of the (a) or (b) type above, is preferred.

As conjugated dienes, butadiene-1,3,2-methyl-1,3-butadiene, 2,3-di(C1-C5 alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene are in particular suitable. As vinyl aromatic compounds, styrene, ortho-, meta-, para-methylstyrene, the "vinyl-toluene" commercial mixture, para-tert-butylstyrene, methoxystyrenes, chlorostyrenes, vinylmesitylene, divinylbenzene, vinylnaphthalene are for example suitable.

The copolymers may contain between 99% and 20% by weight of diene units and between 1% and 80% by weight of vinyl aromatic units. The elastomers may have any microstructure which depends on the polymerization conditions used, in particular on the presence or absence of a modifying and/or randomizing agent and on the quantities of modifying randomizing agent used. The elastomers may be for example block, random, sequenced or microsequenced elastomers, and may be prepared as a dispersion, emulsion or solution; they may be coupled and/or starred or functionalized with a coupling and/or starring or functionalizing agent.

Diene elastomers chosen from the group consisting of polybutadienes (BR), synthetic polyisoprenes (IR), natural rubber (NR), butadiene copolymers, isoprene copolymers and mixtures of these elastomers are in particular suitable. Such copolymers are more preferably selected from the group consisting of natural rubber, homopolymers and copolymers of isoprene such as isoprene-butadiene copolymers (BIR), isoprene-styrene copolymers (SIR), isoprene-butadiene-styrene copolymers (SBIR), and mixtures of such copolymers.

According to the invention, the polymer having at least one unsaturation or double bond is modified by grafting the compound, also called modifying agent, comprising at least one group Q, and at least one group A bonded together by at least, and preferably, one "spacer" group Sp in which:
Q comprises an azo-dicarbonyl group,
A comprises an associative group comprising at least one nitrogen atom,
Sp is an atom or a group of atoms forming a bond between Q and A.

The expression "associative group" is understood to mean groups capable of combining with each other via hydrogen, ionic and/or hydrophobic bonds. According to a preferred embodiment of the invention, they are groups capable of combining via hydrogen bonds.

When the associative groups are capable of combining via hydrogen bonds, each associative group contains at least one donor "site" and one acceptor site in relation to the hydrogen bond such that two identical associative groups are self-complementary and may combine with each other to form at least two hydrogen bonds.

The associative groups according to the invention are also capable of combining via hydrogen, ionic and/or hydrophobic bonds with functional groups present on fillers.

The compounds according to the invention containing a group Q, a "spacer" group and an associative group may for example be represented by the following formula (Ia):

A-Sp-Q (Ia).

The compounds according to the invention containing a group Q, a "spacer" group and two associative groups may for example be represented by the following formula (Ib):

(Ib)

Likewise, the compounds according to the invention containing two groups Q, a "spacer" group and an associative group may for example be represented by the following formula (Ic):

(Ic)

According to the same principle, compounds according to the invention containing two groups Q, a "spacer" group and two associative groups may for example be represented by the following formula (Id):

(Id)

Preferably, the associative group is selected from an imidazolidinyl, ureyl, bis-ureyl, ureido-pyrimidyl, triazolyl group.

Preferably, the group A corresponds to one of the following formulae (II) to (VI):

(II)

(III)

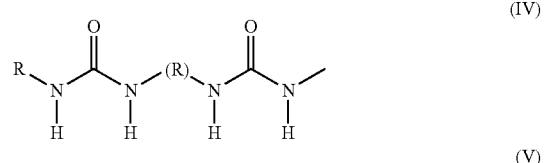
(IV)

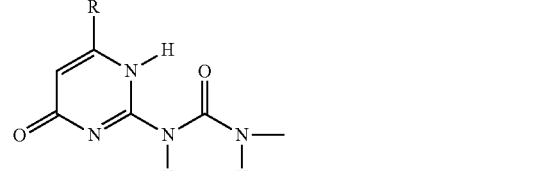
(V)

(VI)

where:
R denotes a hydrocarbon group which may optionally contain heteroatoms,
X denotes an oxygen or sulphur atom, or a group —NH, preferably an oxygen atom.

Preferably, the group A comprises a 5- or 6-membered di- or trinitrogen-containing, preferably dinitrogen-containing, heterocycle comprising at least one carbonyl functional group.

More preferably still, the group A comprises an imidazolidinyl group of formula (II).

The group Q comprises an azo-dicarbonyl-containing group preferably corresponding to the formula:

W—CO—N=N—CO— in which,
W represents
a group of formula:

R'—Z— in which:
Z represents an oxygen or sulphur atom or a group —NH or —NR',
R' represents a $C_1$-$C_{20}$ alkyl, preferably $C_1$-$C_6$ alkyl, and most preferably $C_1$-$C_4$ alkyl, group, for example methyl or ethyl, or
a group of formula:

-Sp'-A' in which:
Sp', which is identical to or different from Sp, is a divalent spacer group bonding the azodicarbonyl-containing functional group to another associative group A',
A', which is identical to or different from A, is an associative group comprising at least one nitrogen atom.

Preferably, the modifying agents according to the invention are represented by the formula (VII)

W—CO—N=N—CO-Sp-A    (VII)

in which W, Sp and A are as defined above and A, Sp and Sp' may contain one or more heteroatoms.

For example, modifying agents according to the invention are represented by the formulae (VIII) or (IX):

R'—Z—CO—N=N—CO-Sp-A    (VIII)

or

A'-Sp'-CO—N=N—CO-Sp-A    (IX)

in which R', Z, Sp, A, Sp' and A' are as defined above and A, Sp and Sp' may contain one or more heteroatoms.

The "spacer" group Sp makes it possible to bond at least one group Q and/or at least one associative group A, and may thus be of any type known per se. The "spacer" group should nevertheless not, or not to any great extent, interfere with the group Q and the associative group of the compound according to the invention.

The "spacer" group is preferably a linear, branched or cyclic hydrocarbon chain which may contain one or more aromatic radicals, and/or one or more heteroatoms. The said chain may be optionally substituted, as long as the substituents are inert with respect to the group Q and the associative group.

According to a preferred embodiment, the "spacer" group is a linear or branched C1-C24, preferably C1-C10, alkyl chain optionally comprising one or more heteroatoms selected from nitrogen, sulphur, silicon or oxygen atoms, more preferably a linear C1-C6 alkyl chain.

Most preferably, the "spacer" group Sp or Sp' is selected from —(CH2)y—, —NH—(CH2)y—, —O—(CH2)y—, y being an integer from 1 to 6.

Preferably, the modifying agent according to the invention is selected from the compounds of the following formulae (X) or (XI):

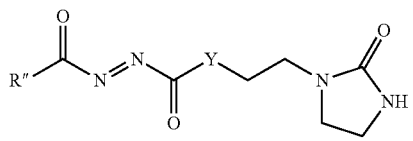
(X)

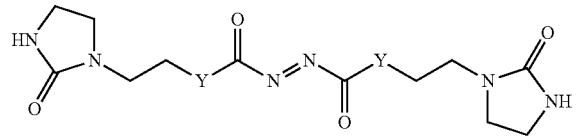
(XI)

in which:
Y represents a divalent group chosen from a methylene group, an oxygen or sulphur atom, and a group —NH—, and
R" represents a C1-C6 alkoxy, preferably a C1-C4 alkoxy, group and most preferably methoxy or ethoxy.

More preferably still, the modifying agent according to the invention may be selected from the compounds of formulae (XII) to (XV) below:

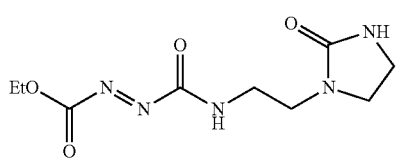
(XII)

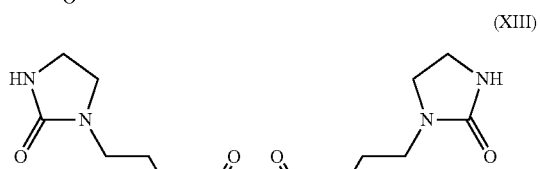
(XIII)

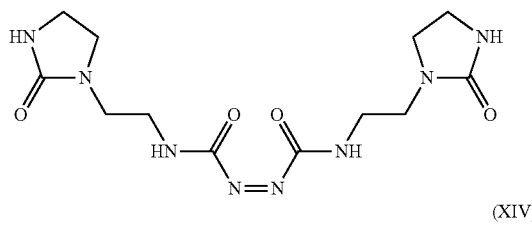
(XIV)

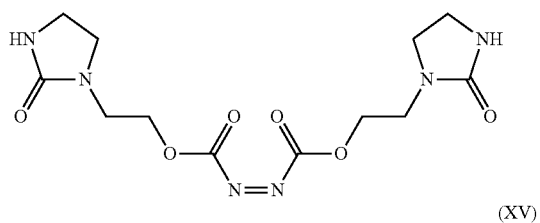
(XV)

The modifying agents according to the invention may be prepared in three steps according to the following general scheme:

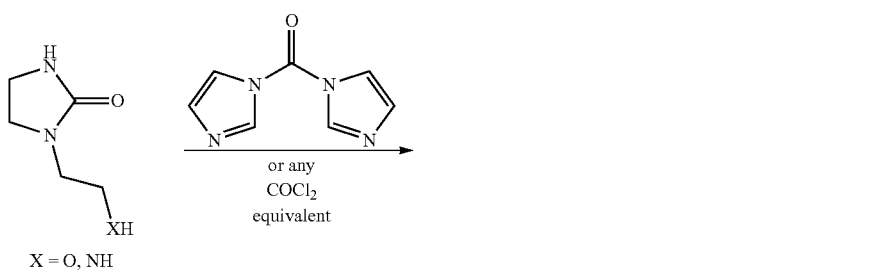

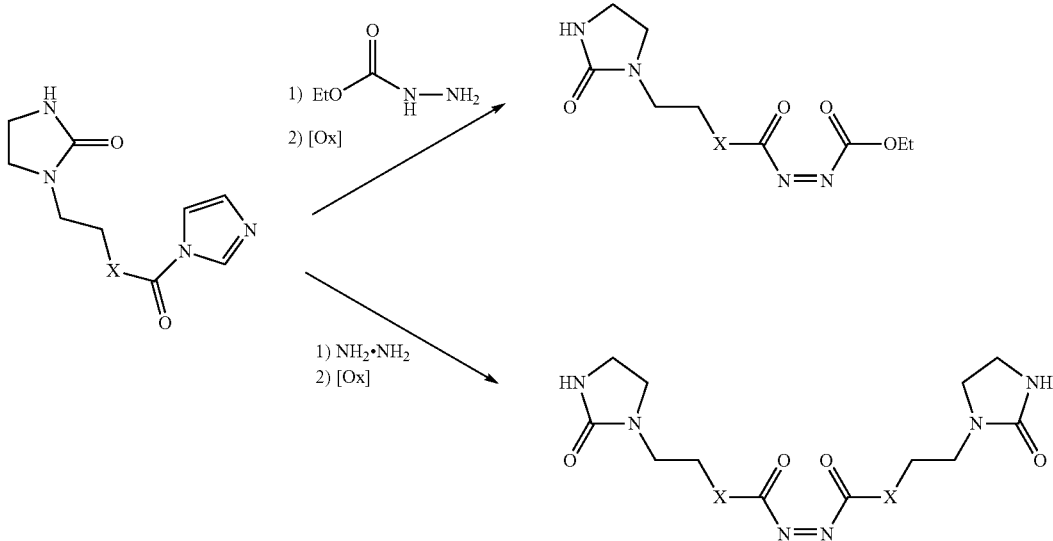

or else by direct reaction on a dialkyl azodicarboxylate or a dialkyl hydrazodicarboxylate according to the following reaction scheme:

the modifying agent. During this reaction, this or these reactive group(s) form(s) covalent bonds with the polymer chain.

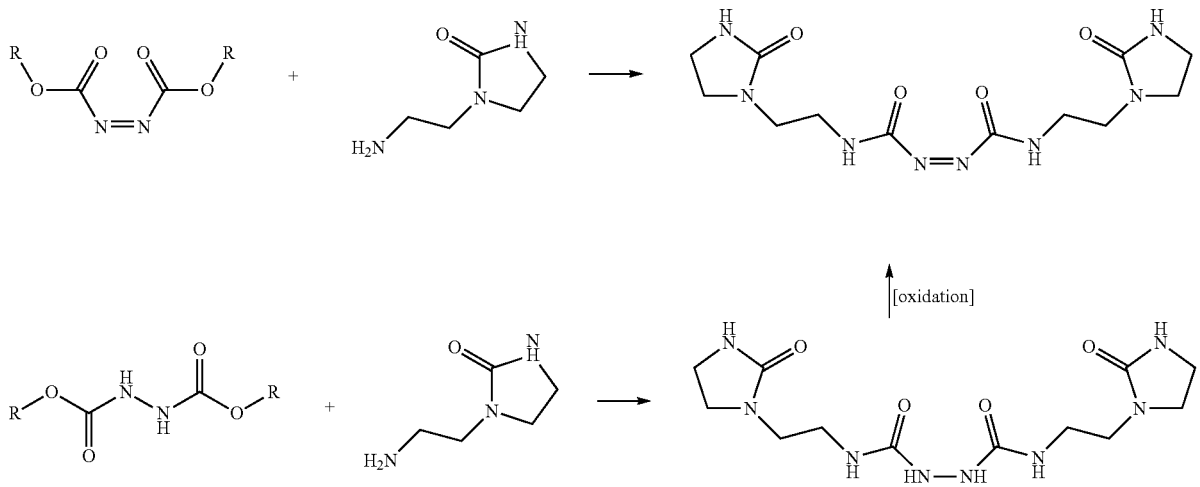

According to a preferred embodiment, the amount of modifying agent varies from 0.01 to 50 mol %, preferably from 0.01 to 5 mol %.

The subject of the invention is also a process for preparing the graft elastomer described above.

The grafting of the polymer is carried out by reacting the said polymer with the reactive group(s) carried by The grafting of the modifying agent is carried out by "ene reaction" on at least one unsaturation or double bond of the chain. The modification does not occur by a reaction with optional functional groups of the polymer. This "ene reaction" may be illustrated by the mechanism on a polyisoprene described below:

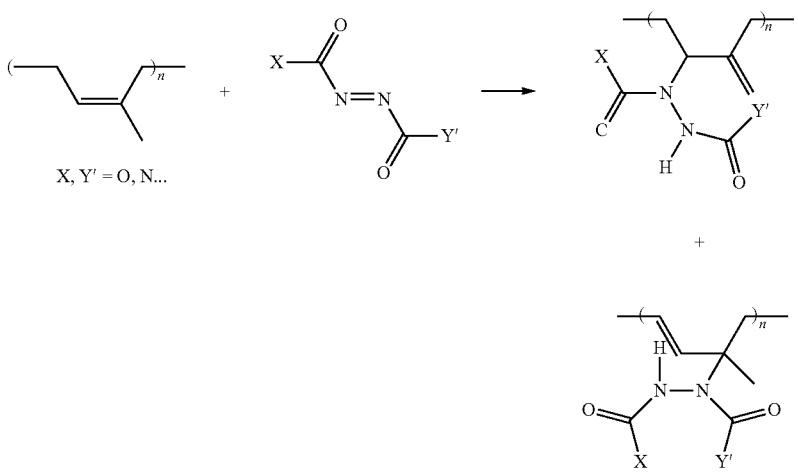
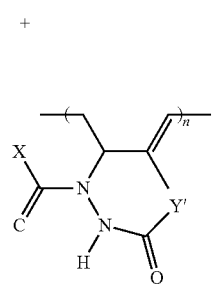

The grafting of the modifying agent may be performed in the mass, for example in an internal mill or an external mill such as an open mill. The grafting is then carried out either at a temperature of the external mill or of the internal mill below 60° C., followed by a reaction step in a press or in an oven at temperatures ranging from 80° C. to 200° C., that is at a temperature of the external mill or of the internal mill greater than 60° C. without subsequent heat treatment.

The grafting of the modifying agent may also be performed in solution.

The grafting process may be performed continuously or batchwise. The polymer thus modified may be separated from the solution by any means known to the person skilled in the art and in particular by a steam stripping operation.

The graft elastomer according to the invention may be used for the manufacture of various rubber articles according to processes known to the person skilled in the art. It is used in this case in a rubber composition with various other components.

Accordingly, the subject of the invention is also a reinforced crosslinked or crosslinkable rubber composition comprising a graft elastomer as described above. By way of reinforcing agents, mention may be made of inorganic reinforcing fillers such as silica, and organic reinforcing fillers such as carbon black.

The addition to this composition of conventional additives for rubber compositions may be envisaged according to their use, such as solvents, plasticizers, crosslinking agents, pigments and the like.

According to a possible application of such a rubber composition, mention may be made of the manufacture of tyres for vehicles. Once crosslinked, the rubber composition may thus be calendered or else extruded in the form of a profiled element of rubber which can be used as a semi-finished element of tyres for vehicles.

The invention and its advantages will be easily understood in the light of the examples of implementation which follow.

EXAMPLES OF IMPLEMENTATION

The determination of the amount of ethyl 2-(2-(2-oxoimidazolidin-1-yl)ethylcarbamoyl)hydrazinecarboxylate grafted is performed by NMR analysis. The spectra are acquired on a BRUKER 500 MHz spectrometer equipped with a "broad band" probe BBIz-grad 5 mm. The quantitative $^1$H NMR experiment uses a 30° single pulse sequence and a repeat delay of 3 seconds between each acquisition. The samples are solubilized in carbon sulphide ($CS_2$). 100 µL of deuterated cyclohexane ($C_6D_{12}$) are added for the lock signal.

The $^1$H NMR spectrum makes it possible to quantify the grafted ethyl 2-(2-(2-oxoimidazolidin-1-yl)ethylcarbamoyl)hydrazinecarboxylate units by integration of the characteristic signals of the $CH_2O$ protons which appear at a chemical shift of δ=3.94 ppm.

The 2D $^1$H-$^{13}$C HSQC NMR spectrum makes it possible to verify the nature of the grafted unit by means of the chemical shifts of the carbon and proton atoms.

Example 1

Modification in Solution of a Synthetic Polyisoprene Comprising More than 90% of 1,4-Cis Linkages 1.1—Preparation of (E)-ethyl 2-(2-(2-oxoimidazolidin-1-yl)ethylcarbamoyl)diazenecarboxylate

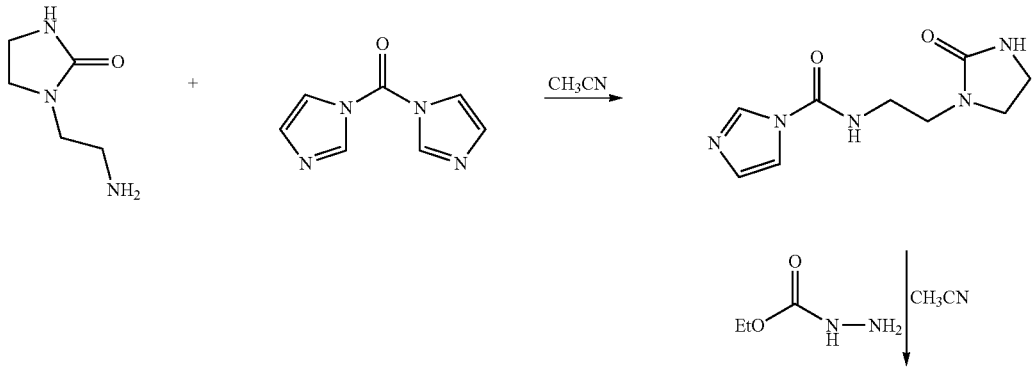

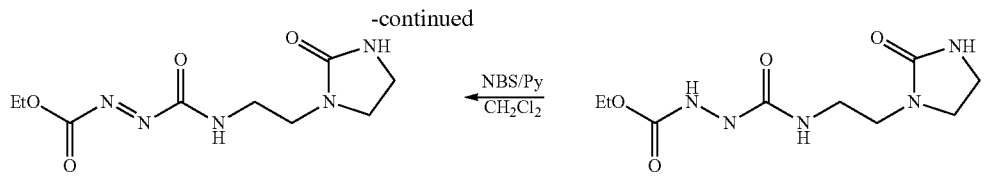

$\xrightarrow[\text{CH}_2\text{Cl}_2]{\text{NBS/Py}}$ a) Preparation of N-(2-(2-oxoimidazolidin-1-yl)ethyl)-1H-imidazole-1-carboxamide N-(2-(2-Oxoimidazolidin-1-yl)ethyl)-1H-imidazole-1-carboxamide is prepared according to the following procedure:

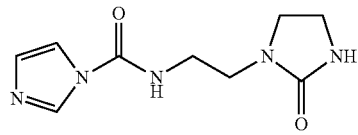 [SMILES: O=C1NCCN1CCNC(=O)n1ccnc1]

To a solution of 1-(2-aminoethyl)imidazolidin-2-one (46.5 g, 0.36 mol) in anhydrous acetonitrile (750 mL) is added carbonyldiimidazole (64.2 g, 0.4 mol) all at once. The reaction medium is then stirred for 3 to 5 hours at room temperature. The precipitate obtained is filtered and washed on the filter with dry acetonitrile (3 times 40 mL) and petroleum ether (twice 50 mL, fraction 40/60° C.) and finally dried for 10-15 hours at room temperature.

A white solid (74.5 g, yield 93%) having a melting point of 154° C. is obtained.

The molar purity is 88 mol % ($^1$H NMR).

$^1$H, $^{13}$C, $^{15}$N NMR characterization

| Atom | δ $^1$H (ppm) + mult. | δ $^{13}$C (ppm) | δ $^{15}$N (ppm) |
|---|---|---|---|
| 1 | — | 162.4 | — |
| 2 | 6.26 (s) | — | −302.7 ($^1J_{1H-15N}$ = 90 Hz) |
| 3 | 3.15 (t) | 37.5 | — |
| 4 | 3.34 (t) | 44.7 | — |
| 5 | — | — | −299.2 |
| 6 | 3.17 (t) | 42.5 | — |
| 7 | 3.28 (t) | 38.4 | — |
| 8 | 8.53 | — | −286.3 ($^1J_{1H-15N}$ = 90 Hz) |
| 9 | — | 148.8 | — |
| 10 | — | — | −185.1 |
| 11 | 8.14 (s) | 135.9 | — |
| 12 | — | — | −112.6 |
| 13 | 6.95 (s) | 139.5 | — |
| 14 | 7.57 (s) | 116.6 | — |

Solvent used: DMSO - Calibration on the DMSO signal at 2.44 ppm for $^1$H, 39.5 ppm for $^{13}$C and sr = 19238.46 for $^{15}$N b) Preparation of ethyl 2-(2-(2-oxoimidazolidin-1-yl)ethylcarbamoyl)hydrazinecarboxylate To N-(2-(2-oxoimidazolidin-1-yl)ethyl)-1H-imidazole-1-carboxamide (74.0 g, 0.33 mol, purity 88 mol % by NMR) in anhydrous acetonitrile (750 mL) is added ethyl hydrazinecarboxylate (38.0 g, 0.36 mol) all at once. The reaction medium is stirred for 3 hours at 70-75° C. and then for 2-3 hours at room temperature. The precipitate is filtered and washed with acetonitrile (twice 50 mL) and petroleum ether (twice 50 mL, fraction 40/60° C.) and finally dried for 10-15 hours at room temperature.

A white solid (79.6 g, yield 93%) having a melting point of 179° C. is obtained.

The molar purity is greater than 99% ($^1$H NMR).

$^1$H, $^{13}$C, $^{15}$N NMR characterization

| Atom | δ $^1$H (ppm) + mult. | δ $^{13}$C (ppm) | δ $^{15}$N (ppm) |
|---|---|---|---|
| 1 | — | 162.4 | — |
| 2 | 6.20 | — | −303.1 ($^1J_{1H-15N}$ = 90 Hz) |
| 3 | 3.13 (t) | 37.6 | — |
| 4 | 3.28 (t) | 45.0 | — |
| 5 | — | — | −298.2 |
| 6 | 2.99 (t) | 43.4 | — |
| 7 | 3.04 (t) | 37.9 | — |
| 8 | 6.33/7.69/8.30/8.68* | — | −301.3* |
| 9 | — | 158.3 | — |
| 10 | 6.33/7.69/8.30/8.68* | — | −301.3* |
| 11 | 6.33/7.69/8.30/8.68* | — | −301.3* |
| 12 | — | 156.9 | — |
| 13 | 3.96 (q) | 60.4 | — |
| 14 | 1.11 (t) | 14.6 | — |

*Protons 8, 10 and 11 being NH groups, their $^1$H chemical shift cannot be precisely attributed. The $^{13}$C chemical shift corresponds to group 8.

Solvent used: DMSO - Calibration on the DMSO signal at 2.44 ppm for $^1$H, 39.5 ppm for $^{13}$C and sr = 19238.46 for $^{15}$N c) Preparation of ethyl 2-(2-(2-oxoimidazolidin-1-yl)ethylcarbamoyl)diazenecarboxylate, compound according to the invention

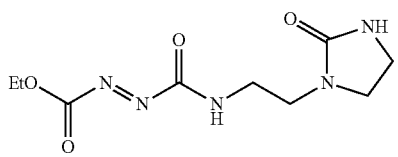 [SMILES: CCOC(=O)/N=N/C(=O)NCCN1CCNC1=O]

To a mixture of pyridine (3.05 g, 0.039 mol) and hydrazine carboxylate OU-IMIA-02 (10.00 g, 0.039 mol) in dichloromethane (200 mL), cooled to 5-10° C. is added N-bromosuccinimide (6.87 g, 0.039 mol) in dichloromethane (100 mL) all at once. The reaction medium is stirred for 1 hour at 3+10° C. and then the organic phase is washed with water (twice 150 mL). The organic phase is then dried for 15 minutes over $Na_2SO_4$ and then the solvents are evaporated under pressure ($T_{bath}$ 18° C., 40-50 mbar). Diethyl ether (300 mL) is added and the reaction medium is stirred for 30-40 minutes at room temperature. The precipitate obtained is filtered and washed on the filter with diethyl ether (3 times 40 mL) and finally dried for 10-15 hours at room temperature.

A yellow solid (6.95 g, yield 70%) having a melting point of 122° C. is obtained.

The molar purity is greater than 95% ($^1$H NMR).

A $^1$H, $^{13}$C NMR characterization is presented in the following table 1.

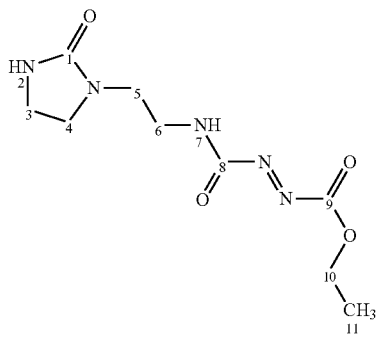

TABLE 1

| Atom | δ $^1$H (ppm) + mult. | δ $^{13}$C (ppm) |
|---|---|---|
| 1 | — | 162.20 |
| 2 | 6.27/9.12* | — |
| 3 | 3.15 (t) | 37.46 |
| 4 | 3.32 (t) | 44.59 |
| 5 | 3.17 (t) | 42.41 |
| 6 | 3.31 (t) | 38.44 |
| 7 | 6.227/9.12* | — |
| 8 | — | 160.42/161.25 |
| 9 | — | 160.42/161.25 |
| 10 | 4.41 (q) | 65.24 |
| 11 | 1.28 (t) | 13.83 |

*Protons 2 and 7 being NH groups, their $^1$H chemical shift cannot be precisely attributed.
Solvent used: DMSO - Calibration on the DMSO signal at 2.44 ppm for $^1$H, 39.5 ppm for $^{13}$C 1.2—Grafting of the Modifying Agent onto Polyisoprene To 70 g of polyisoprene (containing 97.3% by mass of isoprene-1,4 unit and having an Mn=319 000 g/mol and a Vp=2.57) in solution in 1.4 L of THF is added a solution of 2.13 g of ethyl 2-(2-(2-oxoimidazolidin-1-yl)ethylcarbamoyl)diazenecarboxylate in 50 mL of dichloromethane. The reaction medium is stirred for 7 h at 70° C. and the polymer is then coagulated in an acetone/methanol mixture. The polymer is redissolved in toluene and then subjected to an antioxidant treatment by addition of 0.14 g of 4,4'-methylene-bis-2,6-tert-butylphenol and 0.14 g of N-(1,3-dimethylbutyl)-N'-phenyl-p-phenylenediamine. The polymer is dried under vacuum for 48 h at 60° C.

$^1$H NMR analysis shows that the polymer was modified in an amount of 0.21 mol %, which is equivalent to a grafting yield of 40%.

The invention claimed is:

1. A modified polymer obtained by grafting a compound comprising at least one group Q, and at least one group A bonded together by at least, and one "spacer" group Sp wherein:
   Q comprises an azo-dicarbonyl-containing group,
   A comprises an associative group comprising at least one nitrogen atom wherein the associative group is selected from the group consisting of an imidazolidinyl, triazolyl, ureyl, bis-ureyl and ureido-pyrimidyl group,
   Sp is an atom or a group of atoms forming a bond between Q and A.

2. The modified polymer according to claim 1, wherein the polymer is a diene elastomer.

3. The modified polymer according to claim 1, wherein the diene elastomer is essentially saturated.

4. The modified polymer according to claim 1, wherein the diene elastomer is essentially unsaturated.

5. A modified polymer obtained by grafting a compound comprising at least one group Q, and at least one group A bonded together by at least, and one "spacer" group Sp wherein:
   Q comprises an azo-dicarbonyl-containing group,
   A comprises an associative group comprising at least one nitrogen atom wherein the group A corresponds to one of the following formulae (II) to (VI):

(II)

(III)

(IV)

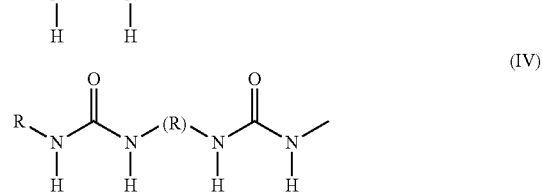

-continued

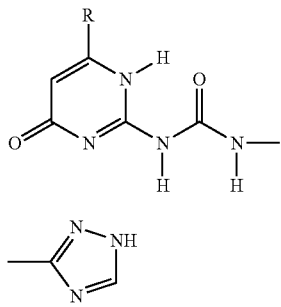
(V)

(VI)

where:
R denotes a hydrocarbon group which may optionally contain heteroatoms,
X denotes an oxygen or sulphur atom, or a group —NH.

6. The modified polymer according to claim 1, wherein the modifying agent is represented by the formula (VII)

W—CO—N=N—CO-Sp-A (VII)

in which:
A is an associative group comprising at least one nitrogen atom,
Sp is a divalent spacer group bonding the azodicarbonyl-containing functional group to the associative group A,
W represents a group of formula:

R'—Z— in which:
Z represents an oxygen or sulphur atom or a group —NH or —NR',
R' represents a $C_1$-$C_{20}$ alkyl,
or
a group of formula:

-Sp'-A' in which:
Sp', which is identical to or different from Sp, is a divalent spacer group bonding the azodicarbonyl-containing functional group to another associative group A',
A', which is identical to or different from A, is an associative group comprising at least one nitrogen atom.

7. The modified polymer according to claim 6, wherein the modifying agent is chosen from the compounds of the following formulae (VIII) or (IX):

R'—Z—CO—N=N—CO-Sp-A (VIII)

or

A'-Sp'—CO—N=N—CO-Sp-A (IX)

in which R' represents a $C_1$-$C_{20}$ alkyl, Z represents an oxygen or sulphur atom or a group —NH or —NR', Sp is an atom or a group of atoms forming a bond, A is an associative group comprising at least one nitrogen atom, Sp,' which is identical to or different from Sp, is a divalent spacer group bonding the azodicarbonyl-containing functional group to another associative group A', and A', which is identical to or different from A, is an associative group comprising at least one nitrogen atom, and wherein A, Sp and Sp' may contain one or more heteroatoms.

8. The modified polymer according to claim 7, wherein the modifying agent is selected from the compounds of the following formulae (X) or (XI):

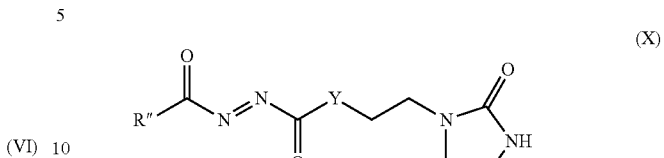
(X)

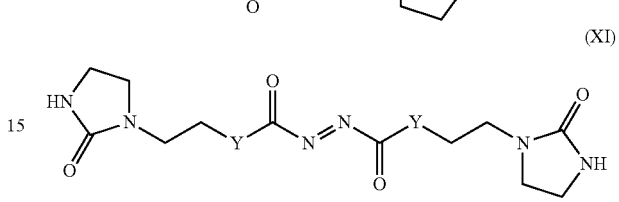
(XI)

wherein:
Y represents a divalent group chosen from a methylene group, an oxygen or sulphur atom, and a group —NH—, and
R" represents a $C_1$-$C_6$ alkoxy.

9. The modified polymer according to claim 1, wherein the "spacer" group Sp or Sp' of the modifying agent is selected from —$(CH_2)_y$—, —NH—$(CH_2)_y$—, and —O—$(CH_2)_y$—, y being an integer from 1 to 6.

10. The modified polymer according to claim 8, wherein the modifying agent is chosen from the compounds of the following formulae (XII) to (XV):

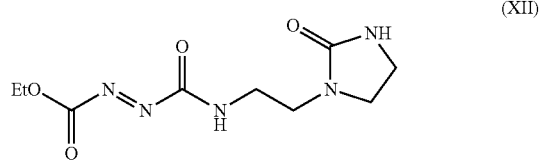
(XII)

(XIII)

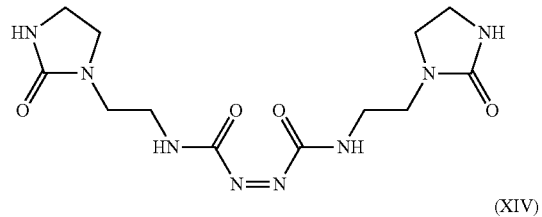
(XIV)

(XV)

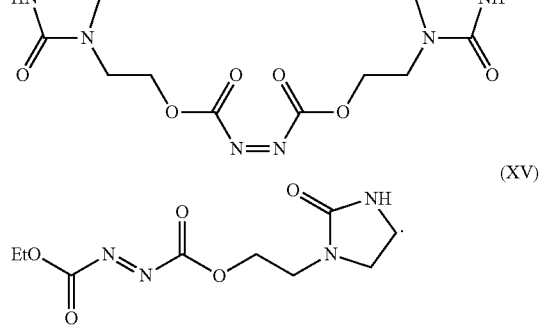

11. A crosslinked or crosslinkable rubber composition comprising a reinforcing filler and a modified polymer as defined in claim 1.

12. A tire comprising a rubber composition as defined in claim 11.

13. The modified polymer according to claim 3, wherein the diene elastomer is selected from the group consisting of copolymers of ethylene-propylene-diene monomer (EPDM) and butyl rubbers.

14. The modified polymer according to claim 4, wherein the diene elastomer is selected from natural rubber, synthetic polyisoprenes, isoprene copolymers and mixtures of these elastomers.

15. The modified polymer according claim 6, wherein R' represents $C_1$-$C_6$ alkyl.

16. The modified polymer according to claim 15, wherein R' represents $C_1$-$C_4$ alkyl.

\* \* \* \* \*